(12) United States Patent
Yamauchi

(10) Patent No.: US 8,988,746 B2
(45) Date of Patent: Mar. 24, 2015

(54) IMAGE SCANNING DEVICE WITH IMPROVED DEW CONDENSATION DETECTION AND CORRECTION

(75) Inventor: Hironori Yamauchi, Osaka (JP)

(73) Assignee: Kyocera Document Solutions Inc. (JP)

( * ) Notice: Subject to any disclaimer, the term of this patent is extended or adjusted under 35 U.S.C. 154(b) by 382 days.

(21) Appl. No.: 13/538,641

(22) Filed: Jun. 29, 2012

(65) Prior Publication Data

US 2013/0027755 A1    Jan. 31, 2013

(30) Foreign Application Priority Data

Jul. 26, 2011    (JP) .................................. 2011-163616

(51) Int. Cl.
| | |
|---|---|
| *G03F 3/08* | (2006.01) |
| *H04N 1/00* | (2006.01) |
| *G03G 15/00* | (2006.01) |
| *H04N 1/03* | (2006.01) |
| *H04N 1/10* | (2006.01) |

(52) U.S. Cl.
CPC ........... *H04N 1/00992* (2013.01); *G03G 15/55* (2013.01); *H04N 1/03* (2013.01); *H04N 1/1013* (2013.01); *G03G 2215/00776* (2013.01)
USPC ........... 358/518; 358/504; 358/509; 358/463; 359/507

(58) Field of Classification Search
USPC .......................... 358/1.9, 3.26, 504, 509, 463
See application file for complete search history.

(56) References Cited

U.S. PATENT DOCUMENTS

| 5,809,826 A * | 9/1998 | Baker, Jr. ........................... 73/75 |
| 6,868,190 B1 * | 3/2005 | Morton .......................... 382/278 |
| 2004/0184007 A1 * | 9/2004 | Silverstein et al. .............. 353/20 |

FOREIGN PATENT DOCUMENTS

| JP | 63-314964 | 12/1988 |
| JP | 10-290364 | 10/1998 |
| JP | H11-127304 | 5/1999 |
| JP | 11-205557 | 7/1999 |
| JP | 11205557 A * | 7/1999 |
| JP | 2000-92286 | 3/2000 |
| JP | 2009-80291 | 4/2009 |

* cited by examiner

*Primary Examiner* — Jamares Q Washington

(57) ABSTRACT

In the aforementioned image scanning apparatus of this embodiment, a condensation detection patch includes pluralities of patch areas with different reflectances arranged adjacently. A data acquiring unit acquires measurement values of the condensation detection patch by an image sensor as condensation detection patch data. A condensation determining unit determines whether condensation occurs or not on the basis of the condensation detection patch data corresponding to one with a low reflectance of two patch areas arranged adjacently in the patch areas.

5 Claims, 4 Drawing Sheets

IMAGE SCANNING DEVICE WITH IMPROVED DEW CONDENSATION DETECTION AND CORRECTION

CROSS-REFERENCE TO RELATED APPLICATIONS

This application relates to and claims priority rights from Japanese Patent Application No. 2011-163616, filed on Jul. 26, 2011, the entire disclosures of which are hereby incorporated by reference herein.

BACKGROUND OF THE INVENTION

1. Field of the Invention

The present invention relates to image scanning apparatuses.

2. Description of the Related Art

When an image scanning apparatus is used in a low temperature environment such as a cold region or an early morning in winter, condensation sometimes occurs on a surface of an optical unit such as a mirror and results in a fall in reflectance, transmittance, or the like, and consequently, an image is scanned darkly and in a low quality. Therefore, an image scanning apparatus includes a heater to prevent from condensation, and performs heating with the heater to warm-up before an image scan.

For example, a known mechanism to prevent from condensation automatically performs heating at a predetermined time or performs heating when it is estimated that condensation occurs on the basis of temperature and humidity. The aforementioned mechanism may perform heating, although condensation does not actually occur. Consequently, it wastes electric power. To solve this problem, an image scanning apparatus estimates that condensation occurs and performs heating when a difference between the last shading data on yesterday and the initial shading data on today is equal to or larger than a predetermined threshold value.

However, in the case that it is estimated whether condensation occurs or not in the aforementioned manner, for example, if condensation occurred when the last shading data on yesterday was obtained, then condensation that currently occurs may not be detected.

SUMMARY OF THE INVENTION

An image scanning apparatus according to an aspect of this disclosure includes: a light source configured to emit light; an image sensor configured to detect reflection light of the light emitted from the light source; a condensation detection patch in which pluralities of patch areas with different reflectances are arranged adjacently; a data acquiring unit configured to acquire measurement values of the condensation detection patch by the image sensor as condensation detection patch data; and a condensation determining unit configured to determine whether condensation occurs or not on the basis of the condensation detection patch data corresponding to one with a low reflectance of two patch areas arranged adjacently in the patch areas.

If condensation occurs on an optical system, then diffused reflection due to the condensation changes a direction of reflection light from a patch area with a high reflectance, and the reflection light from the patch area with a high reflectance is detected at a measurement position of a patch area with a low reflectance. Therefore, a measurement value of the patch area with a low reflectance changes due to the condensation. Consequently, condensation is correctly detected on the basis of the measurement value of the patch area with a low reflectance.

These and other objects, features and advantages of the present invention will become more apparent upon reading of the following detailed description along with the accompanied drawings.

DETAILED DESCRIPTION

Hereinafter, embodiments according to aspects of the present disclosure will be explained with reference to drawings.

Figure 1:
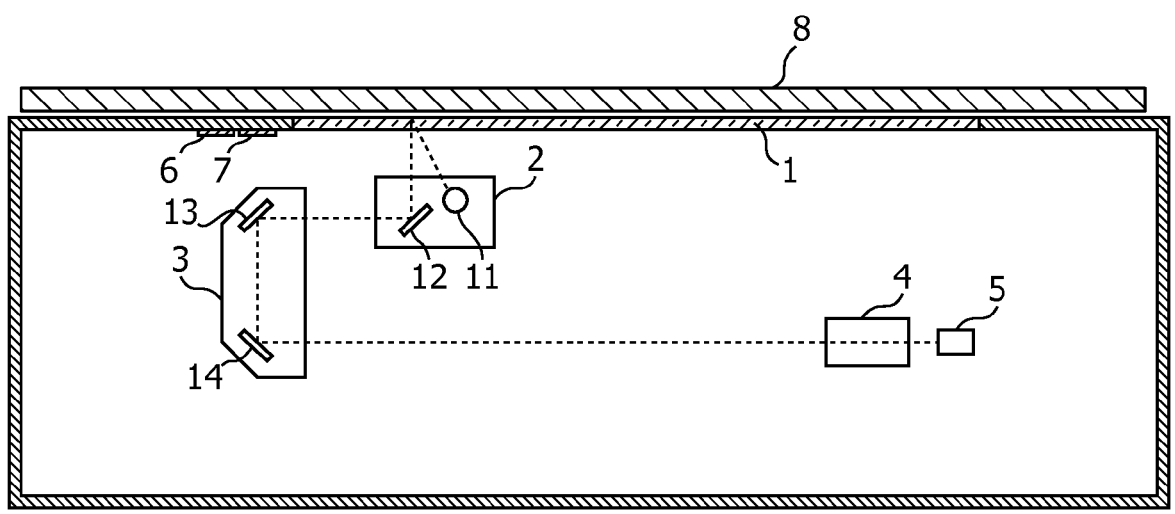
FIG. 1 shows a side view of an internal configuration of an image scanning apparatus in this disclosure.

FIG. 1 shows a side view of an internal configuration of an image scanning apparatus in this disclosure. The image scanning apparatus shown in FIG. 1 is an apparatus such as scanner, copier, or multi-function peripheral.

In FIG. 1, a contact glass 1 is disposed on a top surface of a body of the image scanning apparatus, and a document is put on the contact glass 1 when a document image is scanned from the document.

A carriage 2 is capable of moving in the secondary scanning direction with an unshown driving source. The carriage 2 includes a light source 11 and a mirror 12. The light source 11 is arranged along the primary scanning direction, and emits light, for example, with pluralities of aligned light emitting diodes. The light emitted from the light source 11 reflects at positions corresponding to a position of the carriage 2, such as a document on the contact glass 1, a white reference patch 6 (mentioned below), a condensation detection patch 7, and so forth. The mirror 12 further reflects the reflection light from the document, the white reference patch 6 (mentioned below), the condensation detection patch 7, and so forth.

Further, the carriage 3 is capable of moving together with the carriage 2 in the secondary scanning direction with an unshown driving source. The carriage 3 includes mirrors 13 and 14. The mirrors 13 and 14 reflects light from the mirror 12 of the carriage 2, and outputs the light in the secondary scanning direction.

An imaging lens 4 focuses the light from the mirror 14 on an image sensor 5.

The image sensor 5 is a one-dimensional image sensor which includes light sensing elements corresponding to the predetermined number of pixels aligned in the primary scanning direction, and outputs electronic signals which indicate respective amounts sensed on the pixels line by line. For example, the image sensor 5 may be a CCD (Charge Coupled Device).

The white reference patch 6, disposed on a ceiling surface inside of the apparatus, is a plate-shaped unit used to acquire white reference data.

The condensation detection patch 7, disposed near the white reference patch 6 on a ceiling surface inside of the apparatus, is a plate-shaped unit in which pluralities of patch areas with different reflectances are arranged adjacently.

Figure 2:
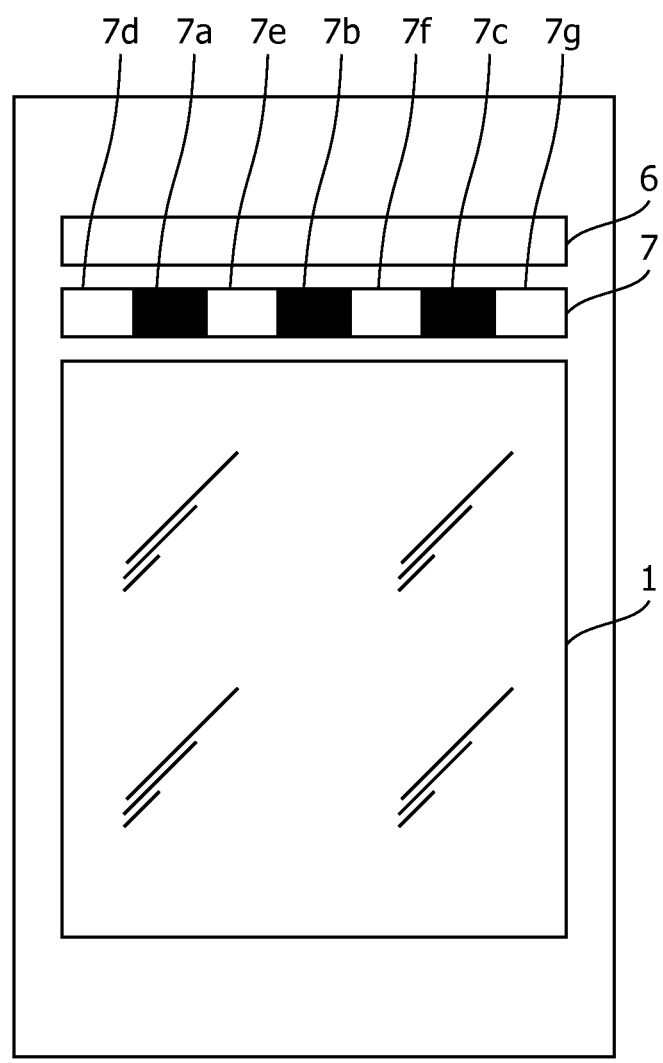
FIG. 2 shows a diagram which indicates an example of a condensation detection patch in this disclosure.

FIG. 2 shows a diagram which indicates an example of the condensation detection patch 7 in this disclosure. The condensation detection patch 7 includes pluralities of patch areas 7a to 7g aligned in the primary scanning direction. The patch areas 7a to 7c are black, and the patch areas 7d to 7g adjacent to the respective patch areas 7a to 7c are white. Therefore, the condensation detection patch 7 includes pluralities of black patch areas 7a to 7c and pluralities of white patch areas 7d to 7g, and the black patch areas 7a to 7c and the white patch areas 7d to 7g are arranged alternately.

A document cover 8 is a substantially flat-plate-shaped unit capable of contacting a surface area of the contact glass 1 when it rotates, and presses a document against the contact glass 1 and prevents environmental light from entering through the contact glass 1 to the inside of the apparatus during image scanning.

Figure 3:
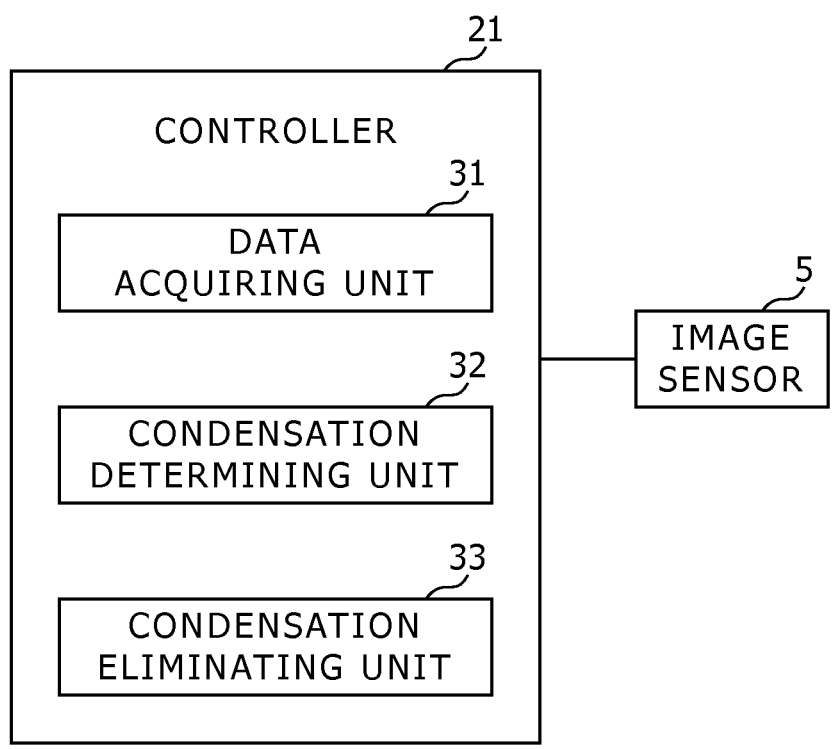
FIG. 3 shows a block diagram which indicates an electronic configuration of the image scanning apparatus in this disclosure.

FIG. 3 shows a block diagram which indicates an electronic configuration of the image scanning apparatus in this disclosure.

In FIG. 3, a controller 21 is a circuit which performs arithmetic processing, control of an unshown driving source in the apparatus, and so forth. The controller 21 is formed with, for example, an ASIC (Application Specific Integrated Circuit), a computer which acts according to a control program, and so forth.

The controller 21 controls the unshown driving source to move the carriages 2 and 3, acquires reference data (the black reference data and the white reference data) for shading correction from the output of the image sensor 5, determines whether condensation occurs or not on the basis of the output of the image sensor 5, acquires image data when image scanning, and performs the shading correction. Since the output of the image sensor 5 is analog signals, an unshown A/D converter converts it to digital signals, and the output of the image sensor 5 is inputted as digital signals into the controller 21.

The controller 21 includes a data acquiring unit 31, a condensation determining unit 32, and a condensation eliminating unit 33.

The data acquiring unit 31 acquires measurement values of the condensation detection patch 7 by the image sensor 5 as condensation detection patch data.

The condensation determining unit 32 determines whether condensation occurs or not on the basis of the condensation detection patch data corresponding to one with a low reflectance (e.g. the patch area 7a, 7b, or 7c in FIG. 2) of two patch areas arranged adjacently in the patch areas. In this embodiment, the condensation determining unit 32 determines whether condensation occurs or not by comparing the measurement value of the image sensor 5 on the patch area with a low reflectance with the black reference data. The black reference data is a measurement value of the image sensor 5 when the light source 11 is off. Further, in this embodiment, the condensation determining unit 32 determines whether condensation occurs or not on the basis of an average value of measurement values by the image sensor 5 on pluralities of pixels in the patch area with a low reflectance.

The condensation eliminating unit 33 eliminates condensation using an unshown heater when the condensation determining unit 32 determines that condensation occurs.

Figure 4:
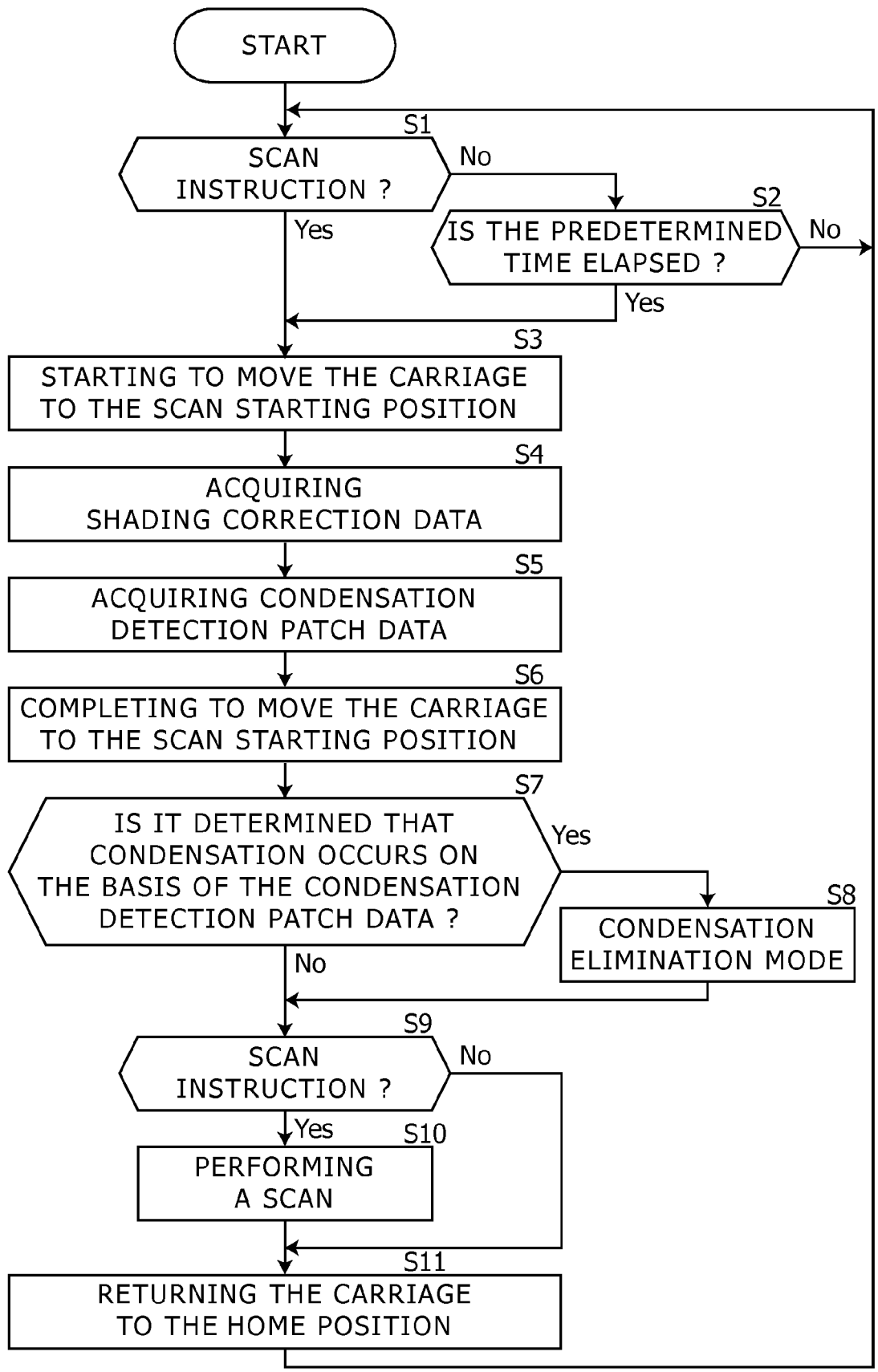
FIG. 4 shows a flowchart which explains a behavior of the image scanning apparatus in this disclosure.

In the following part, a behavior of the aforementioned image scanning apparatus is explained. FIG. 4 shows a flowchart which explains a behavior of the image scanning apparatus in this disclosure.

The controller 21 waits (a) for receiving a scan instruction by a user operation from an unshown operation unit (Step S1), (b) for receiving a scan instruction received by an unshown communication device from an unshown host device (Step S1), and (c) until a predetermined time (e.g. 5 minutes) elapses from either the timing when the apparatus started or the timing when it was determined whether condensation occurs or not last time. This predetermined time is measured by an unshown timer.

Upon receiving the scan instruction or detecting that the time elapses, the controller 21 starts to move the carriage 2 and 3 to the scan starting position (Step S3).

The controller 21 acquires shading correction data that is the black reference data and the white reference data (Step S4). The black reference data is obtained from the output of the image sensor 5 when the light source 11 is off, and the white reference data is obtained from the output of the image sensor 5 at the white reference patch 6.

Further, the data acquiring unit 31 of the controller 21 acquires measurement values of the image sensor 5 at the condensation detection patch 7 as condensation detection patch data, and stores the condensation detection patch data into an unshown memory (Step S5).

Afterwards, the controller 21 completes to move the carriage 2 and 3 to the scan starting position (Step S6).

The condensation determining unit 32 of the controller 21 reads out the condensation detection patch data from the memory, and determines whether condensation occurs or not on the basis of the condensation detection patch data (Step S7).

For example, in the case that the condensation detection patch 7 of this disclosure is used, the condensation determining unit 32 calculates (a) an average value Xa of measurement values by the image sensor 5 in a range of the patch area 7a, (b) an average value Xb of measurement values by the image sensor 5 in a range of the patch area 7b, and (c) an average value Xc of measurement values by the image sensor 5 in a range of the patch area 7c. The condensation determining unit 32 also calculates (d) an average value Xar of the black reference data in the same range as that of the patch area 7a in the primary scanning direction, (e) an average value Xbr of the black reference data in the same range as that of the patch area 7b in the primary scanning direction, (f) an average value Xcr of the black reference data in the same range as that of the patch area 7c in the primary scanning direction. If the measurement value (here, the average value mentioned above) is larger than the black reference value (here, the average value mentioned above) of the black reference data by a Predetermined ratio or more in all of the ranges, then the condensation determining unit 32 determines that condensation occurs. In other words, if in all of the ranges, (Xa/Xar−1>Th or Xa/Xar−1=Th) and (Xb/Xbr−1>Th or Xb/Xbr−1=Th) and (Xc/Xcr−1>Th or Xc/Xcr−1=Th) where Th is a predetermined threshold value, then it is determined that condensation occurs, and otherwise, it is determined that condensation does not occur.

The condensation detection patch data includes the same number of pixel values as the number of the pixels of the image sensor 5, and the black reference data also includes the same number of pixel values. Average values of the pixel values corresponding to the ranges of the patch areas 7a, 7b, and 7c are calculated as the aforementioned average values of the measurement values.

For example, a ratio of the output value (e.g. the average value) of the image sensor 5 in the ranges when condensation does not occur and the black reference value (e.g. the average value) has been measured in advance, and the aforementioned threshold value is set on the basis of its measurement result.

If the condensation determining unit 32 determines that condensation occurs, then the condensation eliminating unit 33 performs heating with an unshown heater to eliminate the condensation (Step S8). If the condensation determining unit 32 determines that condensation does not occur, then the condensation eliminating unit 33 does not perform heating.

After it is determined whether condensation occurs or not in this manner, if the scan instruction has been received (Step S9), then the controller 21 performs image scan of a document and acquires image data of the document (Step S10).

After that, the controller 21 returns the carriages 2 and 3 to the home position (Step S11), and keeps at the aforementioned waiting status in Steps S1 and S2.

In the aforementioned image scanning apparatus of this embodiment, the condensation detection patch 7 includes pluralities of patch areas with different reflectances arranged adjacently, the data acquiring unit 31 acquires measurement values of the condensation detection patch 7 by the image sensor 5 as condensation detection patch data, and the condensation determining unit 32 determines whether condensation occurs or not on the basis of the condensation detection patch data corresponding to one with a low reflectance of two patch areas arranged adjacently in the patch areas.

If condensation occurs on an optical system (the condensation detection patch 7, the mirrors 12, 13, and 14, the imaging lens 4 and so forth), then diffused reflection due to the condensation changes a direction of reflection light from a patch area with a high reflectance (e.g. the patch area 7d to 7g in FIG. 2), and the reflection light from the patch area with a high reflectance (e.g. the patch area 7d to 7g in FIG. 2) is detected at a measurement position of a patch area with a low reflectance (e.g. the patch area 7a to 7c in FIG. 2). Therefore, a measurement value of the patch area with a low reflectance (e.g. the patch area 7a to 7c in FIG. 2) changes due to the condensation. Consequently, condensation is correctly detected on the basis of the measurement value of the patch area with a low reflectance (e.g. the patch area 7a to 7c in FIG. 2).

The description of the present invention has been presented for purposes of illustration and description, and is not intended to be exhaustive or limited to the invention in the form disclosed.

For example, in the aforementioned embodiment, the controller 21 may store the condensation detection patch data on pluralities of lines in the condensation detection patch 7, and the condensation determining unit 32 may determine whether condensation occurs or not on the basis of an average value of measurement values by the image sensor 5 (in each of the ranges) over the lines.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image scanning apparatus, comprising:
   a light source configured to emit light;
   an image sensor configured to detect reflection light of the light emitted from the light source;
   a condensation detection patch in which pluralities of patch areas with different reflectances are arranged adjacently;
   a data acquiring unit configured to acquire measurement values of the condensation detection patch by the image sensor as condensation detection patch data; and
   a condensation determining unit configured to determine whether condensation occurs or not; the condensation determining unit making the determination based on a comparison of a calculated ratio to a predetermined threshold value; the calculated ratio being (1) the average value of measurement values by the image sensor for pixels in the patch area with a low reflectance to (2) a predetermined black reference value; wherein the condensation determining unit determines condensation occurs if the calculated ratio is greater than or equal to the predetermined threshold value for every patch area in the pluralities of patch areas with low reflectance.

2. The image scanning apparatus according to claim 1, wherein:
   one of two patch areas arranged adjacently in the patch areas is black, and the other is white.

3. The image scanning apparatus according to claim 1, wherein:
   the condensation detection patch comprises pluralities of black patch areas and pluralities of white patch areas, and the black patch areas and the white patch areas are arranged alternately.

4. The image scanning apparatus according to claim 1, wherein:
   the condensation determining unit is further configured to determine whether condensation occurs or not on the basis of an average value of measurement values by the image sensor over pluralities of lines in the condensation detection patch.

5. The image scanning apparatus according to claim 1, wherein the predetermined black reference value is obtained from output of the image sensor when the light source is off.

* * * * *